(12) United States Patent
Rai et al.

(10) Patent No.: US 6,503,972 B1
(45) Date of Patent: Jan. 7, 2003

(54) WHITE ELASTOMER SEAL MATERIALS AND A PROCESS FOR MANUFACTURE THEREOF

(75) Inventors: Bunichi Rai, Tokyo (JP); Shinichi Sogo, Yokohama (JP)

(73) Assignee: DuPont Dow Elastomers, L.L.C., Wilmington, DE (US)

( * ) Notice: Subject to any disclaimer, the term of this patent is extended or adjusted under 35 U.S.C. 154(b) by 0 days.

(21) Appl. No.: 09/700,437

(22) PCT Filed: May 28, 1999

(86) PCT No.: PCT/JP99/02846
§ 371 (c)(1),
(2), (4) Date: Jun. 7, 2001

(87) PCT Pub. No.: WO99/62994
PCT Pub. Date: Dec. 9, 1999

(51) Int. Cl.[7] .................................................. C08K 3/10
(52) U.S. Cl. ............................................ 524/413; 523/1
(58) Field of Search ................................ 524/413; 523/1

(56) References Cited

U.S. PATENT DOCUMENTS

| 4,316,836 A | 2/1982 | Aufdermarsh, Jr. |
| 5,501,827 A | 3/1996 | Deeney et al. |
| 5,696,189 A | 12/1997 | Legare |

FOREIGN PATENT DOCUMENTS

| EP | 0870792 A1 | 10/1998 |
| GB | 1394911 | 5/1975 |

*Primary Examiner*—Kriellion A. Sanders

(57) ABSTRACT

A highly durable, high whiteness elastomer seal material molded from a composition comprising a perfluoroelastomer and a white pigment and having a surface with a whiteness of at least 90 as expressed by a W (Lab) color expression system under the conditions of a 2 degree field of view and a C-light source.

8 Claims, 1 Drawing Sheet

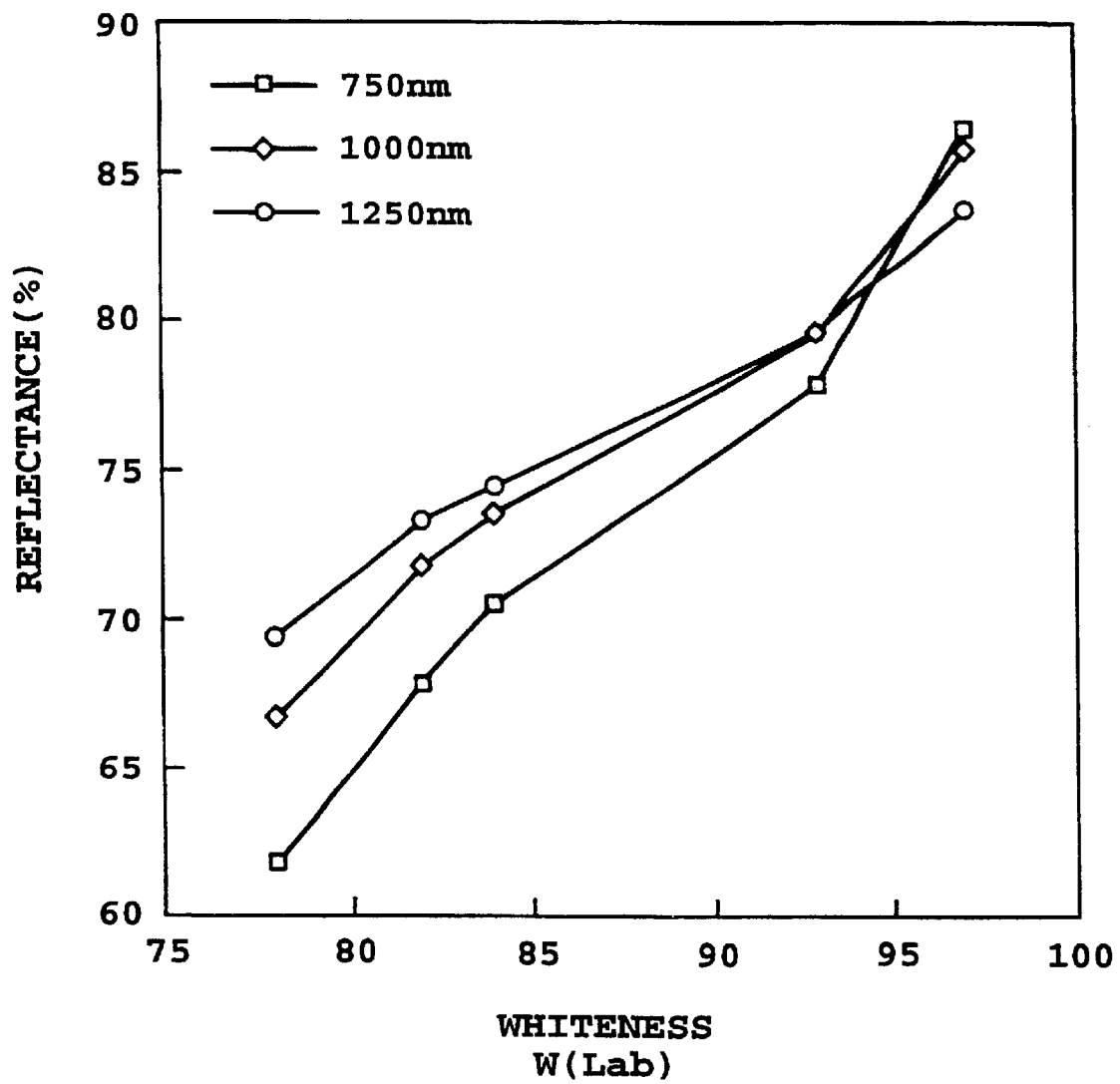

WHITE ELASTOMER SEAL MATERIALS AND A PROCESS FOR MANUFACTURE THEREOF

FIELD OF THE INVENTION

The present invention relates to a seal material which is suitably used in an apparatus where the seal section thereof is irradiated with infrared light such as in an apparatus using infrared light such as a heat source in a semi-conductor industry or the like, an apparatus where there is a secondary infrared light generation because of use at a high temperature of 600° C. or higher, specifically to a highly durable seal material which has excellent heat resistance and chemical resistance along with a minimal rise in temperature when irradiated with infrared light.

The present invention relates to a process for manufacturing a white elastomer seal material.

DESCRIPTION OF THE PRIOR ART/RELATED ART

Elastomers such as silicon rubber and nitrile rubber have heretofore been widely used as seal materials. In particular, because of their excellent heat resistance and chemical resistance, fluoroelastomers are used as seal materials in automobile, aircraft, space exploration devices, industrial machinery, semi-conductor manufacturing equipment, and the like. Perfluoroelastomers are suitably used as seal materials in semi-conductor manufacturing equipment, because they have particularly outstanding heat resistance and chemical resistance. Seal materials comprising fluoroelastomers or perfluoroelastomers compounded with metal oxides have also been developed for improved plasma resistance, including white seal materials. For example, WO-A-9719983 discloses perfluoroelastomer compositions which can be effectively used in the processing conditions found in dry process semiconductor manufacturing environments. These perfluoroelastomer compositions are substantially free of elemental carbon and contain selected metallic reinforcing fillers and titanium dioxide which provides a certain degree of whiteness to the cured articles resulting from the compositions.

However seal materials which are used under environments which may be irradiated with infrared light suffer from the likelihood of degradation due to a rise in the surface temperature of the seal material. None of the prior art materials used have yet been able to solve the problem of the seal material undergoing degradation under such environments.

SUMMARY OF THE INVENTION

Under such circumstances, an object of the present invention is to provide a highly durable seal material which has excellent heat resistance and chemical resistance along with a minimal rise in temperature when irradiated with infrared light.

Another object of the present invention is to provide a process for manufacturing a white elastomer seal material wherein the process has enhanced productivity.

Specifically, the invention is aimed at providing a high surface whiteness seal material and a process for manufacture thereof.

The present invention resides in the discovery that enhancing the whiteness of the seal material surface enables the rise in the surface temperature of the seal material to be suppressed when the material is irradiated with infrared light, and the inventors' further continued intensive study has led to the finding that a seal material having a whiteness of at least 90 as expressed by a W (Lab) color expression system under the conditions of a 2° field of view and a C-light source is accompanied by a minimal rise in temperature when irradiated with infrared light.

In the first aspect of the present invention, a white elastomer seal material is molded from a composition comprising a perfluoroelastomer and a white pigment in an amount at least 3% by weight based on the weight of the composition and having a surface with a whiteness of at least 90 as expressed by a W (Lab) color expression system under the conditions of a 2° field of view and a C-light source.

In the second aspect of the present invention, a process for manufacturing a seal material having a surface with a whiteness greater than 75 as expressed by a W (Lab) color expression system under the conditions of a 2° field of view and a C-light source comprises molding a seal material from a composition comprising a perfluoroelastomer and a white pigment in an amount of at least 1% by weight based on the weight of the composition and dipping the molded seal material in aqueous hydrogen peroxide solution for a time sufficient to increase the initial whiteness of the white elastomer seal material by at least 5 units.

In the third aspect of the present invention, a process for manufacturing a seal material having a surface with a whiteness greater than 75 as expressed by a W (Lab) color expression system under the conditions of a 2° field of view and a C-light source comprises molding a seal material from a composition comprising a perfluoroelastomer and a white pigment in an amount of at least 1% by weight based on the weight of the composition and irradiating the molded seal material with ultraviolet light for a time sufficient to increase the initial whiteness of the white elastomer seal material by at least 5 units.

In the fourth aspect of the present invention, a process for manufacturing a seal material having a surface with a whiteness greater than 75 as expressed by a W (Lab) color expression system under the conditions of a 2° field of view and a C-light source comprises molding a seal material from a composition comprising a perfluoroelastomer and a white pigment in an amount of at least 1% by weight based on the weight of the composition and exposing the molded seal material to ozone for a time sufficient to increase the initial whiteness of the white elastomer seal material by at least 5 units.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a graph illustrating the relationship between the whiteness and the percent infrared reflectance of perfluoroelastomer surfaces.

DETAILED DESCRIPTION OF PREFERRED EMBODIMENTS

The seal material of this invention is molded from a composition comprising a perfluoroelastomer and at least 3% by weight of a white pigment based on the weight of the composition.

Perfluoroelastomers, unlike partially fluorinated elastomers, contain no chemically-degradable carbon-hydrogen bonds in parts of the main polymer chain so that a whitening method in addition to adding a white pigment can be applied, which can enhance the whiteness of the seal material surface as expressed by a W (Lab) color expression system to a level greater than 75, preferably of at least 80, more preferably of at least 90.

The compositions of the present invention are based on perfluoroelastomers. By "perfluoroelastomers" it is meant herein elastomeric perfluoropolymers, that is, substantially fully fluorinated fluoropolymers which, when cured, exhibit an elastomeric character. The perfluoroelastomers contain copolymerized cure site monomers that render the polymers crosslinkable.

Perfluoroelastomers are polymeric compositions having copolymerized units of at least two principal perfluorinated monomers. Generally, one of the principal comonomers is a perfluoroolefin, while the other is a perfluorovinyl ether. Representative perfluorinated olefins include tetrafluoroethylene and hexafluoropropylene. Suitable perfluorinated vinyl ethers are those of the formula

  (I)

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula

  (II)

where X is F or $CF_3$, n is 0–5, and $R_f$ is a perfluoroalkyl group of 1–6 carbon atoms. A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula

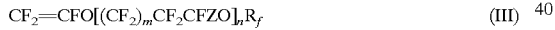  (III)

where $R_f$ is a perfluoroalkyl group having 1–6 carbon atoms, m=0 or 1, n=0–5, and Z=F or $CF_3$. Preferred members of this class are those in which $R_f$ is $C_3F_7$, m=0, and n=1.

Additional perfluoro(alkyl vinyl) ether monomers include compounds of the formula

  (IV)

where m and n=1–10, p=0–3, and x=1–5. Preferred members of this class include compounds where n=0–1, m=0–1, and x=1.

Examples of useful perfluoro(alkoxy vinyl) ethers include

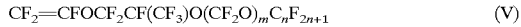  (V)

where n=1–5, m=1–3, and where, preferably, n=1.

Mixtures of perfluoro(alkyl vinyl) ethers and perfluoro (alkoxy vinyl) ethers may also be used.

Preferred perfluoroelastomers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

The perfluoropolymer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used. Suitable cure site monomers include nitrile-containing fluorinated olefins and nitrile-containing fluorinated vinyl ethers. Other cure site monomers include olefins represented by the formula $R_1CH=CR_2R_3$, wherein $R_1$ and $R_2$ are independently selected from hydrogen, fluorine, bromine and iodine and $R_3$ is independently selected from hydrogen, fluorine, bromine, iodine, alkyl, and perfluoroalkyl. The alkyl group may be substituted with one or more halogen atoms. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, 4-bromo-3,3,4, 4-tetrafluorobutene-1, 4-iodo-3,3,4,4-tetrafluorobutene-1, trifluoroethylene, 1-hydropentafluoropropene, and 2-hydropentafluoropropene.

Useful nitrile-containing cure site monomers include those of the formulas shown below.

  (VI)

where n=2–12, preferably 2–6;

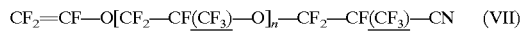  (VII)

where n=0–4, preferably 0–2;

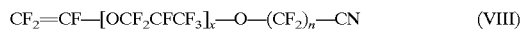  (VIII)

here x=1–2, and n=1–4; and

  (IX)

where n=2–4.

Those of formula (VIII) are preferred. Especially preferred cure site monomers are perfluorinated polyethers having a nitrile group and a trifluorovinyl ether group. A most preferred cure site monomer is

  (X)

i.e. perfluoro(8-cyano-5-methyl-3,6-dioxa-1-octene) or 8-CNVE.

The perfluoroelastomers suitable for use in the present invention may contain any of a variety of end groups as a result of the use of varying initiators or chain transfer agents during polymerization. For example, the polymers may contain sulfonate, sulfonic acid, carboxylate, carboxylic acid, carboxamide, difluoromethyl groups or trifluorovinyl groups.

Any conventional white pigment may be used as the white pigment component whether organic or inorganic, provided that the white pigment results in the whitening effect according to the present invention. This specifically includes titanium oxide, barium sulfate, silicon dioxide, a fluororesin such as polytetrafluoroethylene and the like. Titanium dioxide is especially preferred. The white pigment is incorporated at least in an amount of 1% by weight, preferably 3% by weight based on the weight of the composition. A level below 1% by weight will not completely whiten the surface layer of the sheet material to which the whitening treatment of this invention is carried out, failing to provide a white seal material.

The sealing material of the present invention will generally include a compound which is capable of crosslinking the perfluoroelastomer, for example an organotin compound or certain amino group-containing benzene compounds.

Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 parts per hundred parts rubber, i.e. phr, of curing agent can be used, and 1–4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above.

A preferred cure system, useful for perfluoroelastomers containing nitrile-containing cure sites utilizes bis (aminophenols) and bis(aminothiophenols) of the formulas

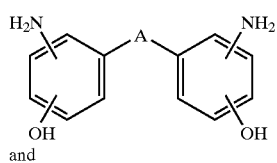

(XI)

and

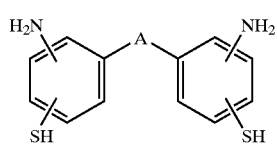

(XII)

and tetraamines of the formula

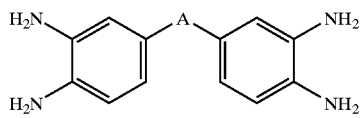

(XIII)

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XI and XII above, are interchangeably in the meta and para positions with respect to the group A. Preferably, the curing agent is a compound selected from the group consisting of 2,2-bis[3-amino-4-hydroxyphenyl] hexafluoropropane; 4,4'-sulfonylbis(2-aminophenol); 3,3'-diaminobenzidine; and 3,3',4,4'-tetraaminobenzophenone. The first of these preferred curing agents will be referred to as diaminobisphenol AF. The curing agents can be prepared as disclosed in U.S. Pat. No. 3,332,907 to Angelo.

Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. Of the members the preferred class, a particularly referred compound is 3,3'-diaminobenzidine.

The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.5 parts.

Additives, such as accelerators, stabilizers, plasticizers, lubricants, fillers, and processing aids typically utilized in perfluoroelastomer compounding can be incorporated into the compositions of the present invention, provided they have adequate stability for the intended service conditions.

Seal materials comprising elastomer compositions can be molded by known methods such as extrusion, compression molding, and the like.

The compositions of the invention may be prepared by mixing the perfluoroelastomer, white pigment, optional curing agent and any other components using standard rubber compounding procedures. For example, the components may be mixed on a two roll rubber mill, in an internal mixer, for example, a Banbury internal mixer, or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 200° C. for several hours.

The surface of the seal material must have a whiteness of greater than 75 as expressed by a W (Lab) color expression system under the conditions of a 20 field of view and a C-light source, preferably a whiteness of 80 or higher, more preferably a whiteness of 90 or higher. The higher the whiteness, the greater the extent of suppressing the rise in the surface temperature of the seal material when irradiated with infrared light, the greater the difficulty with which the seal material will degrade; a whiteness of 90 or higher can significantly prevent the seal material from degrading.

A seal material having a surface with a whiteness of greater than 75 as expressed by a W (Lab) color expression system under the conditions of a 2° field of view and a C-light source may be obtained by dipping a seal material molded from a perfluoroelastomer and white pigment in aqueous hydrogen peroxide solution. The specific whitening treatment conditions are suitably selected according to the degree of whiteness required from among, the concentration of the aqueous hydrogen peroxide solution, the temperature of the solution, and the dipping time. Tables 1 and 2 show typical treatment conditions for a seal material having a surface with at least 80 in whiteness and typical treatment conditions for a seal material having a surface with at least 90 in whiteness, respectively.

TABLE 1

| Aqueous hydrogen peroxide solution, temperature | About 20° C. | About 60° C. | About 60° C. | 60–80° C. |
|---|---|---|---|---|
| Aqueous hydrogen peroxide solution, concentration | 3% | 0.1% | 1% | 1–3% |
| Dipping time | 90–100 hrs | 30–40 hrs | 10–15 hrs | 8–12 hrs |
| Whiteness W (Lab) | 80–89 | 80–89 | 80–89 | 80–89 |

TABLE 2

| Aqueous hydrogen peroxide solution, temperature | About 60° C. | About 80° C. | About 80° C. |
|---|---|---|---|
| Aqueous hydrogen peroxide solution, concentration | 4% | 3% | 10% |
| Dipping time | 96 hrs | 72 hrs | 48 hrs |
| Whiteness W (Lab) | 90– | 90– | 90– |

A seal material having a surface whiteness of greater than 75 as expressed by a W( Lab) color expression system under the conditions of a 20 field of view and a C-light source can also be obtained by irradiating a seal material molded from a composition comprising a perfluoroelastomer and a white pigment with UV light. Specific whitening treatment conditions are suitably selected according to the degree of whiteness required in terms of the UV light wavelength and irradiation time.

For example, a seal material having a surface with a whiteness of greater than 75 can be prepared by irradiating a molded seal material with UV light at a wavelength not longer than 300 nm for 1 hour at room temperature in a chamber. A seal material having a surface with at least 90 in whiteness can be obtained by irradiating a molded seal material with UV light at a wavelength not longer than 300 nm for three hours at room temperature in a chamber.

A seal material having surface whiteness greater than 75 as expressed by a W (Lab) color expression system under the conditions of a 2° field of view and a C-light source may also be obtained by exposing a seal material molded from a composition comprising a perfluoroeleatomer and a white pigment to ozone. Other whitening methods fail to give a seal material having a surface with at least 95 in whiteness as expressed by the W (Lab) color expression system under the conditions of a 2° field of view and a C-light source, but an exposure to ozone at a concentration of 3% for about 12 minutes in a chamber at a temperature of 180° C. can bring the whiteness of the seal material surface to 95 or higher.

The ozone may be in gaseous form or it may be an aqueous ozone solution, preferably containing 10% ozone in gas or 50 ppm ozone in an aqueous solution.

Specific whitening treatment conditions are suitably selected according to the required whiteness in terms of the ozone concentration, the inner chamber temperature, and the ozone exposure time. However, the temperature within the chamber must not be higher than the temperature limit for the heat resistance of the perfluoroelastomer used. Generally, this will be between 200° C. and 320° C. The treatment time can be shortened by an exposure to both UV light and ozone.

TABLE 3

| Chamber internal temperature | room temp. | 20° C. | 20° C. | 180° C. | 180° C. |
|---|---|---|---|---|---|
| Ozone concentration | 3% | 3% | 10% | 3% | 3% |
| Ozone exposure time | Approx. 5 min | 30 min | 20 min | 8 min | 12 min |
| Whiteness W (Lab) | 80–89 | 90–94 | 90–94 | 90–94 | 95– |

Without further elaboration, it is believed that one skilled in the art can, using the description herein, utilize the present invention to its fullest extent. The following specific embodiments are to be construed as illustrative, and not as constraining the remainder of the disclosure in any way whatsoever.

EXAMPLES

In the following examples, all parts are by weight unless otherwise indicated.

W (Lab) Color Expression System

Whiteness, W (Lab), was determined on a Nippon Denshoku Industries Company Limited Model SZ-Sigma 80 Color Measuring System. In this system, reflection of Commission Internacional de L'Eclairage (CIE) White Light Source C was measured from the rubber parts. The resulting CIELab values were then converted to W (Lab) using the formula W (Lab)=$100-[(100-L)^2+a^2+b^2]^{1/2}$. A W (Lab) value of 100 is perfectly white, while a value of 0 is perfectly black.

Examples 1–2 and Comparative Examples 1–3

The polymer used in the examples was a terpolymer having copolymerized units of 56.2 wt. % tetrafluoroethylene, 43 wt. % perfluoromethyl perfluorovinyl ether, and 0.8 wt. % 4-bromo-3,3,4,4-tetrafluorobutene-1. The polymer was mixed with the following additives to form a curable composition.

| | |
|---|---|
| Polymer | 100 parts by weight |
| Titanium dioxide | 20 parts by weight |
| Proton Sponge ™ | 0.5 parts by weight |
| Trimethylallylisocyanurate | 2.0 parts by weight |
| Luperco ™ 101-XL | 3.0 parts by weight |

Luperco™ 101-XL is a mixture of (2,5-dimethyl-2,5-bis (t-butyl)hexane and 45% inert ingredients. Proton Sponge is 1,8-bis-(dimethylamino) napthalene, commercially available from Aldrich Chemical Company.

The compounded polymer was molded into a perfluoroelastomer sheet which was cured at 200° C. for 15–20 minutes and post cured in an air oven at 288° C. for 24 hours.

Disc sample pieces 25 mm in diameter were fabricated from the cured sheet.

The surface of the test piece was whitened under the conditions given in Table 4. Table 4 shows the whiteness of the surface of each test piece as expressed by a W (Lab) color expression system under the conditions of a 2° field of view and a C-light source.

A whitened test piece was mounted on a device with 10 a large sample chamber unit MPC-3100 attached to a spectral photometer, UV-3100, manufactured by Shimazu Seisakusho and was illuminated with light at a wavelength given in Table 4, thereby measuring % reflectance of each test piece. The results are given in Table 4 and FIG. 1.

TABLE 4

| | Ozone or $H_2O_2$ Concentration | Chamber internal temperature | Irradiation time | Whiteness W (Lab) | Percent reflectance at wavelength 750 nm | Percent reflectance at wavelength 1000 nm | Percent reflectance at wavelength 1250 nm |
|---|---|---|---|---|---|---|---|
| Ex. 1 | 3% OZONE | 180° C. | 30 minutes | 97 | 86.43% | 85.73% | 83.70% |
| Ex. 2 | 3% OZONE | 180° C. | 8 minutes | 94 | 79.32% | 77.48% | 77.56% |
| Comp. Ex. 1 | 3% $H_2O_2$ | 80° C. | 10 hours | 84 | 70.48% | 73.49% | 74.43% |
| Comp. Ex. 2 | 1% $H_2O_2$ | 80° C. | 10 hours | 82 | 67.82% | 71.75% | 73.28% |
| Comp. Ex. 3 | 10% $H_2O_2$ | 20° C. | 8 hours | 78 | 61.72% | 66.68% | 69.37% |

A test piece surface having a whiteness of at least 90 has a high percent reflectance, making it possible to prevent a rise in surface temperature. As the whiteness reaches 95, the reflectance becomes considerably high so that seal materials having a whiteness 95 or higher, will serve particularly fittingly in environments where the rise in the surface temperature of infrared irradiated seal materials is an issue.

Example 3–6

The polymer used in the examples was a terpolymer having copolymerized units of 56.2 wt. % tetrafluoroethylene, 43 wt. % perfluoromethyl perfluorovinyl ether, and 0.8 wt. % 4-bromo-3,3,4,4-tetrafluorobutene-1. The polymer was mixed with the following additives to form a curable composition.

| Polymer | 100 parts by weight |
| --- | --- |
| Titanium dioxide | 20 parts by weight |
| Proton Sponge ™ | 0.5 parts by weight |
| Trimethylallylisocyanurate | 2.0 parts by weight |
| Luperco ™ 101-XL | 3.0 parts by weight |

Luperco™ 101-XL is a mixture of (2,5-dimethyl-2,5-bis (t-butyl)hexane and 45% inert ingredients.

Proton Sponge is 1,8-bis-(dimethylamino) napthalene, commercially available from Aldrich Chemical Company.

The compounded polymer was molded into a perfluoroelastomer sheet which was cured at 200° C. for 15–20 minutes and post cured in an air oven at 288° C. for 24 hours.

A dumbbell shaped #3 specimen was prepared as a test piece in accordance with JIS K6250 and K6251 dated 1993, using the cured sheet.

The resultant test pieces were dipped in 3% aqueous hydrogen peroxide solution at 80° C. for given time intervals listed in Table 5, after which the whiteness was calculated. Tensile strength and elongation at the break according to JIS K 6250 dated 1993, were also measured. The results are given in Table 5.

Comparative Example 4

The test piece was prepared in the same manner as that for Example 3–6 and the whiteness was calculated for the resultant test piece. The result is given in Table 5.

Comparative Example 5

The polymer used in the example was a terpolymer having copolymerized units of 55.2 wt. % tetrafluoroethylene, 42.6 wt. % perfluoromethyl perfluorovinyl ether, and 2.2 wt. % perfluoro(8-cyano-5-methyl-3,6-dioxa-1-octene). The polymer was mixed with the following additives to form a curable composition.

| Polymer | 100 parts by weight |
| --- | --- |
| 18-crown-6 polyether | 0.2 parts by weight |
| Polytetrafluoroethylene | 2 parts by weight |
| Titanium dioxide | 3 parts by weight |
| Tetraphenyltin | 2 parts by weight |

The compounded polymer was molded into a perfluoroelastomer sheet which was cured at 200° C. for 15–20 minutes and post cured under nitrogen at 288° C. for 24 hours.

A dumbbell shaped #3 specimen was prepared as a test piece in accordance with JIS K6250 and K6251 dated 1993, using the cured sheet, and the whiteness was calculated for the resultant test piece. The result is given in Table 5.

TABLE 5

|  | Ex. 3 | Ex. 4 | Ex. 5 | Ex. 6 | Comp. Ex. 4 | Comp. Ex. 5 |
| --- | --- | --- | --- | --- | --- | --- |
| White pigment (% by weight) | 16 | 16 | 16 | 16 | 16 | 5 |
| Dipping time (hours) | 16 | 40 | 72 | 96 | 0 | 0 |
| Whiteness W (Lab) | 84 | 87 | 90 | 91 | 73 | 35 |
| Tensile strength (kgf/cm$^2$) | 147 | 140 | 141 | 135 | 167 | — |
| Elongation at the break (%) | 185 | 198 | 208 | 174 | 175 | — |

A comparison of Examples 3–6 with Comparative Examples 4 and 5 indicates that even after being dipped in aqueous hydrogen peroxide solution to improve the whiteness, the seal materials can maintain their required mechanical properties.

Examples 7–11

The test piece was prepared in the same manner as that for Example 3–6.

The resultant test pieces were exposed to ozone at a concentration 3% and/or UV light at wavelengths 185 nm and 284 nm in a chamber for a time given in Table 6, and then their whiteness was calculated. Mechanical properties were also measured as with Examples 3–6. The results are given in Table 6.

TABLE 6

|  | Ex. 7 | Ex. 8 | Ex. 9 | Ex. 10 | Ex. 11 |
| --- | --- | --- | --- | --- | --- |
| Ozone | No | No | Yes | Yes | Yes |
| UV | Yes | Yes | Yes | No | Yes |
| Chamber Internal temperature (° C.) | 20 | 180 | 20 | 180 | 180 |
| Ozone and/or UV Exposure time (min) | 180 | 180 | 180 | 180 | 180 |
| Whiteness W (Lab) | 88 | 85 | 93 | 97 | 96 |
| Tensile strength (kgf/cm$^2$) | 170 | 171 | 172 | 177 | 198 |
| Elongation at the break (%) | 271 | 280 | 275 | 270 | 298 |

A comparison of Example 8 with Example 10 indicates that the under the same conditions, exposure to ozone can increase the whiteness more than can UV irradiation. A comparison of Example 7 with Example 8 suggests that the whitening by UV light irradiation is not affected by the chamber internal temperature. A comparison of Example 10 with Example 11 demonstrates that whitening by an exposure to ozone under high temperature conditions can give whiteness no different that which would have been obtained without the combined use of UV light; however, a combined use of ozone along with UV light can result in better mechanical properties.

Example 12

Sample 12A was prepared by compounding the following components on a two-roll rubber mill: 100 parts of a terpolymer containing copolymerized units of tetrafluoroethylene (TFE), perfluoro(methyl vinyl)ether (PMVE) and 8-CNVE, (weight ratio TFE/PMVE/8-CNVE 48.8/49/2.2), prepared substantially according to the general process described in U.S. Pat. No. 5,789,489; 1.5 parts diaminobisphenol AF curative; and 1.03 parts titanium dioxide. Samples 12B, 12C, and 12D were prepared in the same manner, except that 12B contained 2.07 parts titanium dioxide and 100 parts terpolymer, 12C contained 3.14 parts titanium dioxide and 100 parts terpolymer, and 12D contained 5.34 parts titanium dioxide and 100 parts terpolymer. Slabs of 2–3 mm thickness of the compounded compositions were cured in a press at 200° C. for 15–20 minutes and then post cured in an air oven at 288° C. for 24 hours. The cured slabs were exposed to gaseous ozone at a concentration of 10% in a chamber at 200° C. under the conditions shown in Table 7. The degree of whiteness was determined using the W (Lab) color expression system under conditions of a 2° field of view and a C-light source.

TABLE 7

| Sample | 12A | 12B | 12C | 12D |
|---|---|---|---|---|
| Initial whiteness value | 63.4 | 72.2 | 74.8 | 80.2 |
| Whiteness after 15 minute exposure to ozone | 71.8 | 85.0 | 87.4 | 91.5 |
| Whiteness after 30 minute exposure to ozone | 77.1 | 86.8 | 88.8 | 92.3 |
| Whiteness after 60 minute exposure to ozone | 78.9 | 87.8 | 90.2 | 93.3 |

The present invention has been described in detail with respect to preferred embodiments. Changes and modifications may be made without departing from the invention in its broader aspects, and it is the intention, therefore, in the appended claims to cover all such changes and modifications as fall within the true spirit of the invention.

What is claimed is:

1. A white elastomer seal material molded from a composition comprising a perfluoroelastomer and a white pigment in an amount of at least 3% by weight based on the weight of the composition and having a surface with a whiteness of at least 90 as expressed by a W (Lab) color expression system under the conditions of a 2° field of view and a C-light source.

2. A process for manufacturing a seal material having a surface with a whiteness greater than 75 as expressed by a W (Lab) color expression system under the conditions of a 2° field of view and a C-light source, wherein the process comprises molding a seal material from a composition comprising a perfluoroelastomer and a white pigment in an amount of at least 1% by weight based on the weight of the composition and dipping the molded seal material in aqueous hydrogen peroxide solution for a time sufficient to increase the initial whiteness of the white elastomer seal material by at least 5 units.

3. A process for manufacturing a seal material having a surface with a whiteness of at least 80 as expressed by a W (Lab) color expression system under the conditions of a 2° field of view and a C-light source, wherein the process comprises molding a seal material from a composition comprising a perfluoroelastomer and a white pigment in an amount of at least 3% by weight based on the weight of the composition and dipping the molded seal material in aqueous hydrogen peroxide solution for a time sufficient to increase the initial whiteness of the white elastomer seal material by at least 5 units.

4. A process for manufacturing a seal material having a surface with a whiteness greater than 75 as expressed by a W (Lab) color expression system under the conditions of a 2° field of view and a C-light source, wherein the process comprises molding a seal material from a composition comprising a perfluoroelastomer and a white pigment in an amount of at least 1% by weight based on the weight of the composition and irradiating the molded seal material with ultraviolet light for a time sufficient to increase the initial whiteness of the white elastomer seal material by at least 5 units.

5. A process for manufacturing a seal material having a surface with a whiteness of at least 80 as expressed by a W (Lab) color expression system under the conditions of a 2° field of view and a C-light source, wherein the process comprises molding a seal material from a composition comprising a perfluoroelastomer and a white pigment in an amount of at least 3% by weight based on the weight of the composition and irradiating the molded seal material with ultraviolet light for a time sufficient to increase the initial whiteness of the white elastomer seal material by at least 5 units.

6. A process for manufacturing a seal material having a surface with a whiteness greater than 75 as expressed by a W (Lab) color expression system under the conditions of a 2° field of view and a C-light source, wherein the process comprises molding a seal material from a composition comprising a perfluoroelastomer and a white pigment in an amount of at least 1% by weight based on the weight of the composition and exposing the molded seal material to ozone for a time sufficient to increase the initial whiteness of the white elastomer seal material by at least 5 units.

7. A process for manufacturing a seal material having a surface with a whiteness of at least 80 as expressed by a W (Lab) color expression system under the conditions of a 2° field of view and a C-light source, wherein the process comprises molding a seal material from a composition comprising a perfluoroelastomer and a white pigment in an amount of at least 3% by weight based on the weight of the composition and exposing the molded seal material to ozone for a time sufficient to increase the initial whiteness of the white elastomer seal material by at least 5 units.

8. A white elastomer seal material manufactured by the process of any one of claims 2–7.

* * * * *